April 21, 1959     G. V. RODGERS     2,883,662
PULSE OPERATED SERVOMECHANISM
Filed April 28, 1950     4 Sheets-Sheet 1
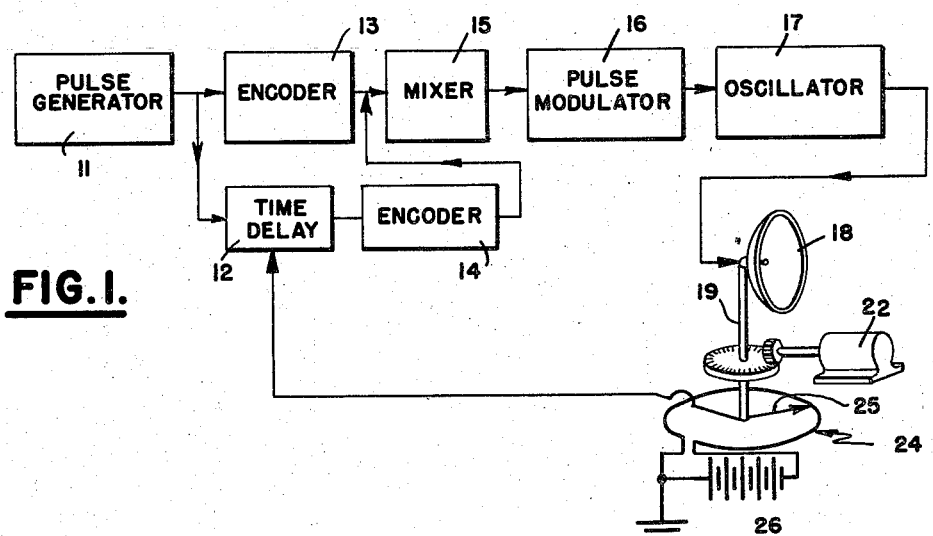
FIG. 1.
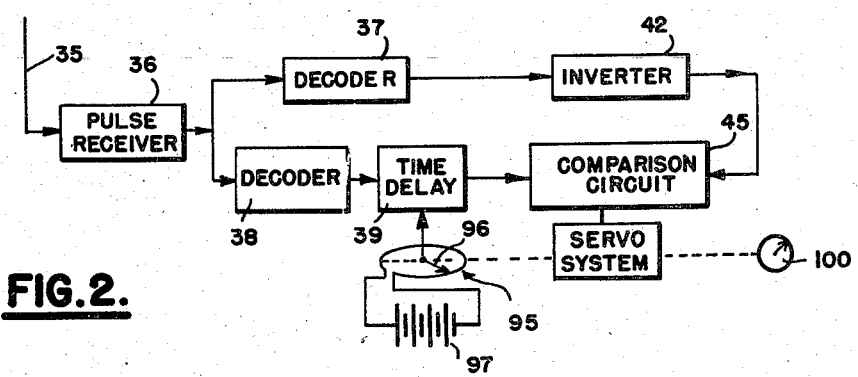
FIG. 2.
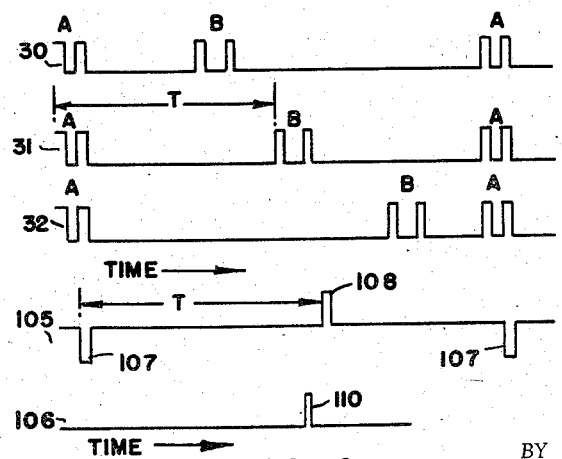
FIG. 3.
FIG. 4.
INVENTOR
GEORGE VICTOR RODGERS
BY
ATTORNEYS April 21, 1959 G. V. RODGERS 2,883,662
PULSE OPERATED SERVOMECHANISM
Filed April 28, 1950 4 Sheets-Sheet 3

INVENTOR
GEORGE VICTOR RODGERS
BY
ATTORNEYS

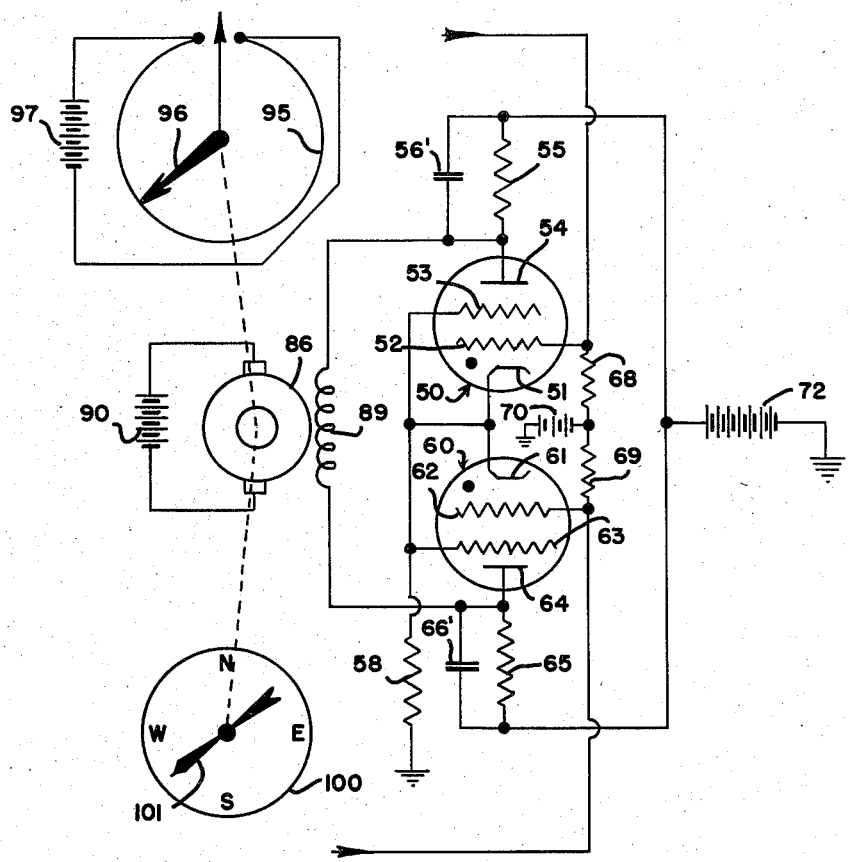

United States Patent Office 2,883,662
Patented Apr. 21, 1959

2,883,662

PULSE OPERATED SERVOMECHANISM

George Victor Rodgers, Lexington Park, Md.

Application April 28, 1950, Serial No. 158,876

5 Claims. (Cl. 343—106)

(Granted under Title 35, U.S. Code (1952), sec. 266)

The present invention relates to an automatic navigation system and more particularly to a servo-system responsive to the time interval between spaced pulses received from a remote transmitter.

Transmission systems are presently available which indicate direction, range, or position by the time interval between discrete pulses of energy occurring in a repetitious sequence, and receiving systems for these transmission systems are also available. However, these systems require cathode ray oscillographs and intricate timing circuits which require the entire attention of an operator while in operation and are structurally relatively delicate. In addition, the receiving systems are in general bulky and require large amounts of power for their operation. In many cases, such as an installation on a fighter aircraft carrying only a pilot, the space and weight requirements are extremely limited and the pilot cannot concentrate his attention on the operation of the necessary receiving equipment.

In accordance with the present invention, the operator tunes the receiver to a desired station, after which the apparatus itself furnishes the desired information in immediately usable form to the operator. In addition to the simple operation of the device, the equipment requires a very small number of electronic tubes and draws very little power.

The invention herein described is adaptable although not limited to, an aircraft beacon system in which a pulse transmitter is provided with a highly directional antenna and transmits a series of pairs of pulses. The first pulse in each pair supplies a reference for the second pulse, so that the desired information is indicated by the time interval between the first or reference pulse and the second or indicating pulse. Thus, if the beacon is to provide directional information, the pulses are spaced from each other by a known interval when the antenna is pointed in a predetermined azimuth such as north, and the interval is changed in a predetermined relationship with azimuth as the directional antenna is rotated about a vertical direction.

The present invention requires a conventional receiver capable of receiving pulse signals from the pulse transmitter and provides an output circuit which separates the reference pulses from the indicating pulses. The reference pulses are applied to an adjustable time delay circuit capable of easy adjustment to any time interval within the range of the delayed pulse, and the output of the time delay circuit and the indicating pulses are applied to a comparison circuit to produce a polar output, the polarity of which depends upon whether the indicating pulses arrive before the delayed reference pulses or vice versa. The output of the comparison circuit is used to control a servo-system which readjusts the time delay circuit to produce coincidence of the two pulses. If the time delay circuit is appropriately calibrated, the setting of the time delay circuit is a measure of the spacing between the reference pulse and the indicating pulse directly.

It is an object of the present invention to provide an accurate time-measuring circuit which does not require an oscilloscope and its associated circuits.

It is a further object of the present invention to provide a direct-reading time interval measuring circuit for use with a pulsed transmission system.

It is a still further object of the present invention to provide a servo-system responsive to the time interval between a reference pulse and an indicating pulse.

It is an additional object of the present invention to provide a rebalancing servo-system actuated from pulsed transmitter.

It is a yet further object of the present invention to provide a remote control system employing a pulse-modulated communication system.

Further objects and advantages of the present invention will be made apparent by reference to the following description and to the appended drawings in which Fig. 1 is a block diagram of a pulsed transmitter usable with the present invention;

Fig. 2 is a block diagram of the present invention;

Fig. 3 is a graph illustrating the wave energy received at the remote receiver of the present invention;

Fig. 4 is a graph illustrating the action of the time-delay circuit of the present invention;

Fig. 8 is a modification of the comparison circuit shown in Fig. 5.

Figure 5:
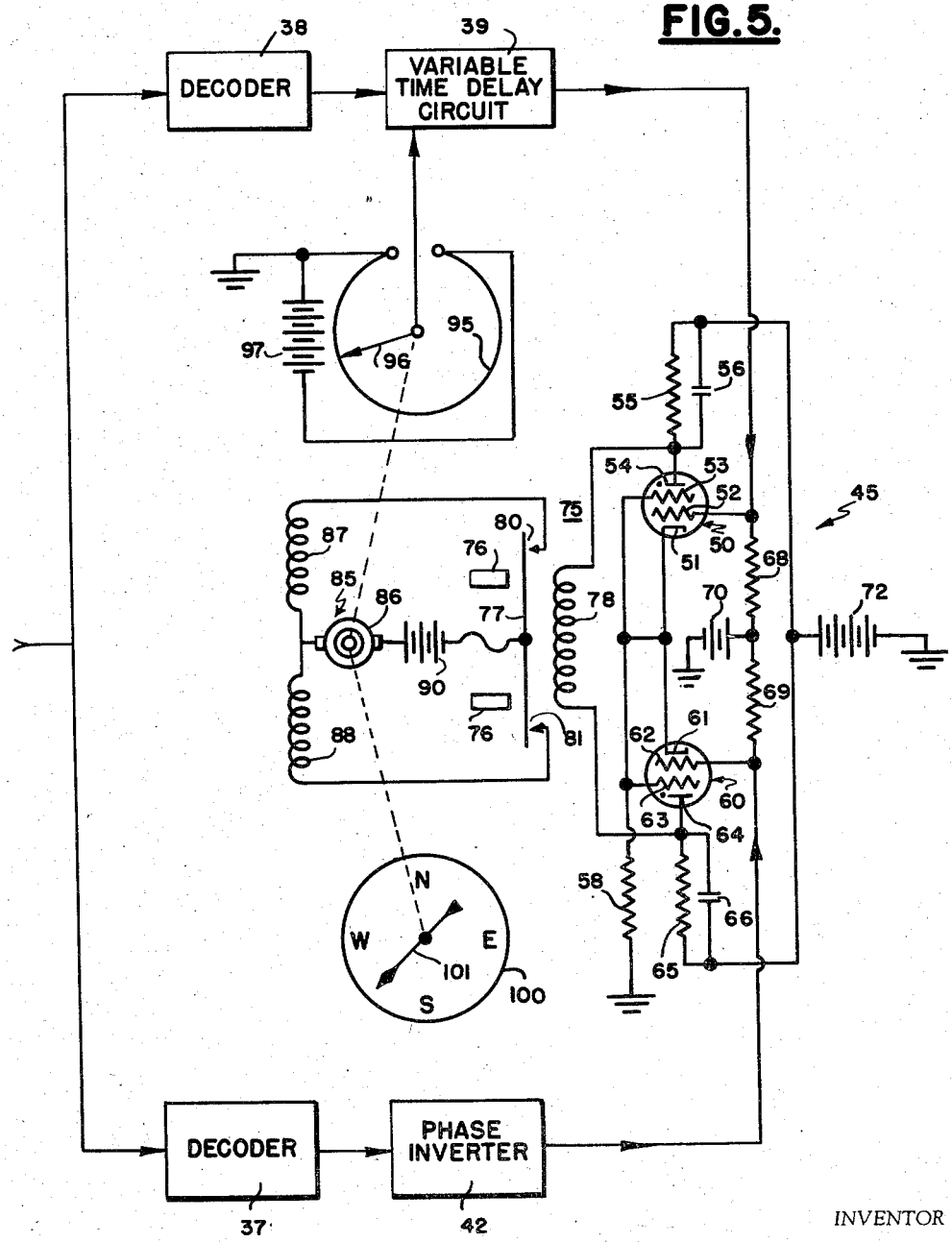
Fig. 5 is a diagram of the comparison circuit of the present invention.

A transmitting system suitable for use in the present invention is shown diagrammatically in Fig. 1. In order to prevent ambiguity in the operation of the device and to facilitate separation of the reference pulses from the indicating pulses, the pulses are distinctively encoded. As herein disclosed, each of the pulses is converted into a pair of pulses of predetermined duration and having a distinctive spacing therebetween. For example, the reference pulse may be transmitted as two one-microsecond pulses separated by a three microsecond interval while the indicating pulse is transmitted as two one-microsecond pulses separated by a five microsecond interval. The time interval between reference pulses will be determined by the pulsing rate of the pulse transmitter in conventional radar practice.

Referring now to Fig. 1, the timing oscillator 11 produces a series of positive pulses of a constant duration and spaced in time from each other by a constant time interval. These positive pulses are applied to the adjustable time delay circuit 12 and to the encoding circuit 13, which produces a pair of pulses separated from each other by a constant time interval in response to each pulse from the timing oscillator. The output of the time delay circuit 12 is applied to an encoding circuit 14 which produces a pair of pulses separated from each other by a time interval different from that produced by the encoding circuit 13. The pulses from the encoding circuits 13 and 14 are combined in the mixing circuit 15 and the composite signal is applied to the pulse modulator 16. Each pulse applied to the pulse modulator 16 causes the oscillator 17 to generate a corresponding pulse which is radiated from the directional antenna 18.

The transmitting system illustrated is adapted to transmit pulse signals at a substantially constant rate determined by the pulse generator 11. The signals transmitted in any particular direction will consist of a series of reference pulses each followed by an indicating pulse at an interval behind the reference pulse which is peculiar to that direction. Hence the signals received by a receiver will depend upon the direction of the receiver from the transmitter.

The time delay circuit 12 may be of any type which is readily adjustable in a linear manner, such as a positive-bias multivibrator controlled by an adjustable bias voltage or other suitable circuit. As illustrated herein, the time delay circuit is adapted to be controlled by a direct current bias voltage.

The encoding circuits 14 and 15 may be of any type known to those skilled in the art. As an example, the circuit may consist of a pair of vacuum tubes having a common output circuit so that either tube produces an output pulse therein, with the pulse actuating the circuit applied directly to the grid of one tube and through a time delay line to the grid of the other tube. Thus the first tube immediately produces a pulse in the common output circuit while the second tube produces a similar pulse after a delay determined by the time delay line. Such a circuit is illustrated in United States Patent No. 2,530,957 to G. W. Gilman, issued November 21, 1950. For the purposes of illustration, the time delay line incorporated in the encoding circuit 13 may have a time constant approximately equal to twice the duration of the applied pulse, while the delay line of the encoding circuit 14 may have a time constant approximately equal to three times the pulse width.

The directional antenna 18 is adapted to be rotated about a vertical axis 19 by any suitable means such as the electric motor 22, and a potentiometer 24 having an arm 25 connected to the antenna 18 for rotation therewith is connected in parallel with a suitable source of direct current 26. The voltage between one end of the potentiometer 24 and the arm 25 is impressed on the time delay circuit 12 to control the delay characteristics thereof.

The pulses radiated by the oscillator 17 are illustrated in Fig. 3, in which the reference pulse produced by the encoding circuit 13 is indicated by the symbol "A" and the indicating pulse produced by the time delay circuit 12 and the encoding circuit 14 is indicated by the symbol "B." Curve 30 represents the radiated signal when the antenna 18 is directed in a particular direction such as north or zero azimuth, while the curve 32 represents the signal radiated near the end of the rotational cycle such as an azimuth of 358°. The curve 31 represents an intermediate azimuth.

The receiving apparatus carried by the remote station such as a vessel or an airplane is illustrated at Fig. 2. The antenna 35 may be of a non-directional whip or other desired type of antenna and is connected to a pulse receiver 36 of any well-known type. It will be apparent to those skilled in the art that the output of the pulse receiver 36 will correspond to the signal received from the transmitter, and that the transmitted signal will in turn depend upon the direction of the receiving antenna 35 from the transmitting antenna 18.

The output of the receiver 36 is applied to a pair of decoding circuits 37 and 38 which separate the reference pulses A from the indicating pulses B. The decoding circuits 37 and 38 may be of any well-known type such as a multi-grid vacuum tube so biased that two grids must be positively biased with respect to the cathode simultaneously in order to render the tube conducting, in which the pulses are applied to one of the two grids directly and to the other grid through a time delay line. Thus the first pulse in a pair is impressed on the one grid while the other is de-energized so as to produce no output, but if the interval between pulses is equal to the time constant of the time delay line of the decoding circuit, the second pulse of the pair arrives at the first grid at the same time the first pulse arrives at the second grid through the delay line, so that the tube then conducts a single pulse. In the present example, the time delay lines in the encoding circuit 13 and the decoding circuit 37 have the same time constant and the encoding circuit 14 and the decoding circuit 38 have the same time constant but different from that of the encoding circuit 13. United States Patent No. 2,530,957 previously referred to describes a circuit performing a similar function.

The output of the decoding circuit 38 is impressed on the adjustable time delay circuit 39, which circuit may be similar to the adjustable time delay circuit 12 of the transmitter. The output of the decoding circuit 37 is impressed on an inverter circuit 42 which converts the output from a negative to a positive voltage pulse, and the output of time delay circuit 39 is also taken off as a positive voltage pulse.

The positive voltage pulses from the inverter 42 and the time delay circuit 39 are impressed upon a comparison circuit 45 now to be described. Referring to Fig. 5 of the drawings, the comparison circuit comprises a pair of grid-controlled gas tubes 50 and 60 having their cathodes 51, 61 connected together and grounded through a high resistance 58. The screen grids 53 and 63 are connected to the cathodes, and the control grids 52, 62 are connected through grid resistances 68, 68 to a negative voltage source 70 of sufficient voltage to bias the tubes 50 and 60 so as to render them non-conducting.

The anodes 54, 64 are connected to a source 72 of anode power through the resistances 55, 65 respectively. The resistances 55, 65 have a sufficiently high resistance when in series with the cathode resistance 58 to reduce the anode voltage impressed on the tube sufficiently to stop conduction of the tube. Each of the resistances 55, 65 are parallel by a capacitance 56, 66 respectively of sufficient capacity to maintain conduction in the tube for a time interval only slightly less than the pulsing interval of the transmitter. The operating coil 78 of the polar relay 75 is connected to the anodes 54, 64 to cause the armature 77 to close one or the other set of contacts attached thereto depending upon which of the tubes 50, 60 is conducting. Permanent magnets 76 are positioned adjacent the armature 77 to cause the armature to remain in an actuated position.

The relay is equipped with oppositely disposed contacts 80 and 81, one set of which is open when the other is closed. These contacts 80 and 81 are employed to control a servomotor 85 which may be of any desired type and the description herein is intended to be illustrative only. As illustrated, a reversing series motor 85 employing opposed field coils is employed, the armature 86 being connected to one side of the power source 90, the other side of the power source being connected to the armature 77 of the relay 75. The ends of the field coils 87, 88 are connected to the contacts 80 and 81 respectively.

The armature 86 of the motor 85 is mechanically connected to the movable arm 96 of the potentiometer 95. The potentiometer 95 is similar to the potentiometer 24 associated with the transmitting antenna 18, and is connected in parallel with a source of direct current potential 97. The voltage between one end of the potentiometer 95 and the arm 96 is impressed on the variable time delay circuit 39 to control the time constant thereof.

A compass card 100 having a movable needle 101 associated therewith is mounted in a convenient location in the operator's vision and needle is mechanically connected to the armature 86 for rotation therewith.

The operation of the device is as follows: The transmitter radiates a series of reference pulses and indicating pulses the interval between the two varying with the direction in which the antenna 18 is directed and hence with the direction of transmission. The pulses received at the remote station will therefore be spaced from each other by an amount which depends upon the direction of the remote station from the transmitting station.

At the receiving station, the reference pulses are passed by the decoding circuit 38 while the indicating pulses are rejected thereby but are passed by the decoding circuit 37. The pulses from the decoding circuit 38 are impressed on the adjustable time delay circuit 39, the output of which is a positive pulse, and the output of the decoding circuit 37 is inverted by the inverter 42 to produce a similar positive pulse. The positive pulse from the variable time delay circuit 39 is impressed upon the control grid 52 of the gas tube 50, and the positive pulse from the inverter 42 is impressed on the control grid 62 of the gas tube 60.

The gas tubes 50, 60 are rendered normally non-conducting by means of the fixed grid bias 70. However, a positive pulse applied to either tube will cause that tube to conduct, and in so conducting, raise the potential of the cathode of both tubes which effectively raises the grid bias of the other tube to such a magnitude that a positive pulse applied to the control grid thereof is ineffective to cause the tube to conduct. Therefore, only one tube will conduct at any instant of time.

The polar relay 75 is connected to the anodes 54 and 64 respectively. When the tubes 50 and 60 are non-conducting, the anodes are at the same potential as the source 72 of anode power, and hence no current flows in the relay coil 78. However, when either tube is rendered conductive, the potential of the anode of the conducting tube is reduced and a current flows through the relay coil 78 in a direction which depends upon which tube is conducting so that the relay 75 closes one or the other of its contacts 80 and 81. When either of the contacts 80, 81 are closed, the motor 85 rotates in a direction determined by which of the contacts is closed and changes the time delay produced by the time delay circuit 39 by means of the potentiometer 95 mechanically connected thereto.

The operation of the comparison circuit 45 may be more readily understood by reference to Fig. 4 of the drawings. The output of the adjustable time delay circuit 39 is illustrated by the chart 105 and the output of inverter 42 is represented by the curve 106. The negative pulses 107 produced by the time delay circuit 39 are ineffectual to render the gas tube 50 conducting and may be ignored. It will be noted that the positive pulses 110 and 108 occur close together with the pulse 110 occurring first. The tube 60 will be rendered conducting by the pulse 110 and the tube 50 will be rendered unresponsive to the pulse 108 by the voltage drop produced in resistance 58 by the conduction of tube 60 so that the motor 85 operates in a direction to shorten the time delay of the circuit 39.

The voltage across the resistor 65 is prevented from increasing immediately by the condenser 66, but after the condenser 66 becomes charged, the voltage across the tube 60 is reduced by the resistances 58 and 65 to a value below the ionization voltage so as to render the tube non-conducting and to thus restore the circuit to normal. However, the permanent magnet 76 holds the relay contacts closed and the motor continues to operate until the pulse 108 occurs before the pulse 110.

When the pulse 108 occurs before the pulse 110, the tube 50 is rendered conducting, and the motor 85 is reversed. Thus the motor 85 operates continuously and rotates the potentiometer 95 and the pointer 101 through a small arc. When the circuit is properly adjusted, the pointer oscillates over an arc of 3 or 4 degrees. If the pointer 101 remains still or continuously rotates in one direction, the operator is immediately apprised that the equipment is not operating properly and can disregard the indications thereof, or retune the receiver to another station if he is beyond the range of the transmitting station previously employed.

Fig. 8 shows a modified form of the present invention in which the relay 75 is eliminated and the armature 86 of the electric motor is continuously energized from the battery 90. The field 89 of the motor is connected to the plates 54, 64 of the tubes 50 and 60, and the capacitances 56, 66 are proportioned to have a charging time only slightly shorter than the time required for the rotation of the directional antenna 18.

When the circuit of Fig. 8 is in its normal condition, neither tube 50 nor tube 60 is conducting, and no current passes through the field 89 so that the motor does not rotate. However when either tube is rendered conducting, a voltage is produced, the field 89 to produce a magnetic field in the motor cooperating with the armature 86 to produce a torque in a direction determined by which tube is rendered conducting by pulses applied thereto. After the condenser 56', 66' associated with the conducting tube has become charged, the tube is rendered non-conducting and the circuit is returned to its normal condition until the next pulse is received.

Figure 6:
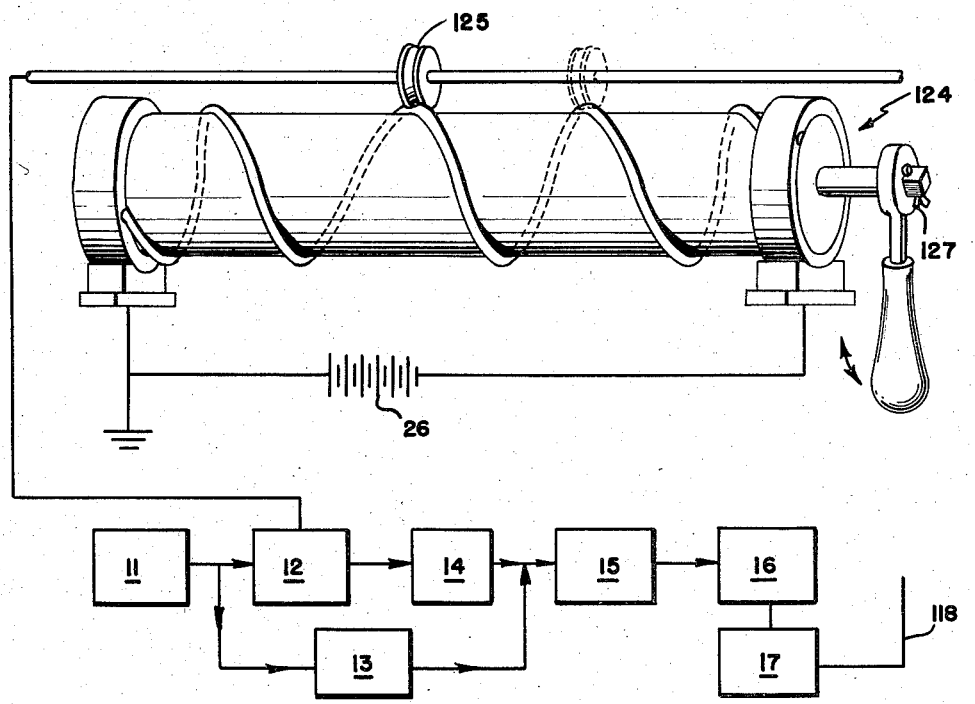
Fig. 6 is a modification of the transmitter shown in Fig. 1 adapted to a remote control system.

The system herein described may be readily adapted to a remote control system for use with a valve, a radio-controlled ship or similar applications. When thus employed, as illustrated in Fig. 6, the spiral potentiometer 124 may be provided with a manual control such as the handle 127 illustrated, and the antenna 118 may be a non-directional vertical whip as shown. In this modification, the radiated signal from the transmitter is non-directional, and the time interval between the reference pulse and the indicating pulse is determined by the position of the contact wheel 125 on potentiometer 124.

Figure 7:
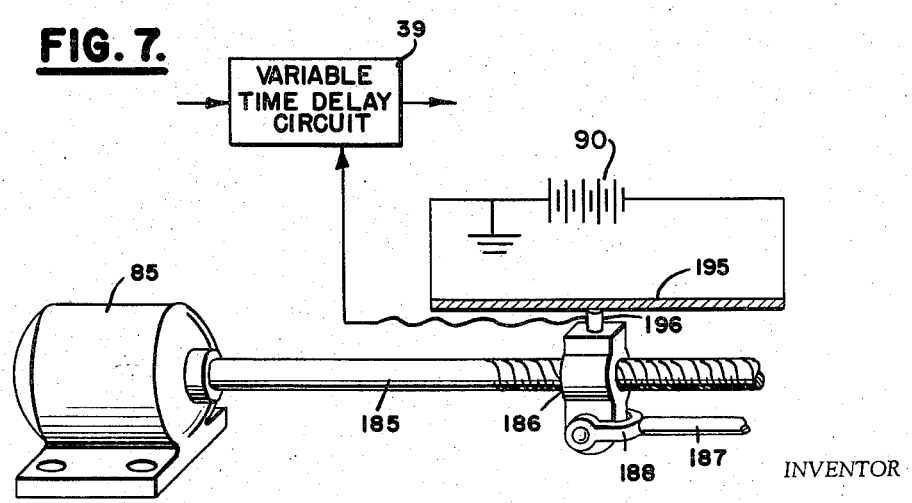
Fig. 7 is a modification of the receiving system of the present invention as applied to a remote control system.

The receiving apparatus for a remote control system for a push-pull rod control system is illustrated at Fig. 7. The motor 85 is mechanically connected to the threaded shaft 185 which turns in the threaded bracket 186, so that rotation of the motor 85 causes the bracket to be moved longitudinally along the rod 185. The control rod 187 is connected to the bracket 186 by means of the yoke 188, so that movement of the bracket 186 also moves the control rod. The resistance strip 195 is mounted parallel to the threaded rod 185 and a contact 196 carried by the bracket 186 bears thereon to form a potentiometer with the battery 90 there across, and the voltage between the contact 196 and one end of the resistance strip 195 is used to control the adjustable time delay circuit 39. The remaining portions of the circuit have been previously described.

It will be apparent to those skilled in the art that many changes and modifications may be made in the device herein described. The type of motor employed may be changed, and the type of motor control may be of any desired type. Those skilled in pulse modulation techniques will recognize that the circuit components herein described may be changed to any of a number of known circuits without changing the function thereof.

The device herein described may be manufactured and used by or for the Government of the United States of America for governmental purposes without the payment of any royalty thereon or therefor.

What is claimed is:

1. In a receiver for use with a pulse-modulated transmission system radiating a reference pulse and an indicating pulse in timed relation thereto, a pulse receiver responsive to said radiated pulses, means for producing a first operating pulse in response to said indicating pulse, an adjustable time delay circuit responsive to said reference pulses to produce a second operating pulse and having a rotatable shaft for adjustment for the time delay produced thereby, a comparison circuit comprising a first and a second current control means each responsive to a pulse applied thereto to render it conductive, means responsive to conduction of one of said current control means to render the other of said current control means unresponsive to a pulse applied thereto, means for applying said first operating pulses to said first current control means and means for applying said second operating pulses to said second current control means, a reversible electric motor mechanically connected to said adjustable time delay circuit to adjust the delay time thereof, and means responsive to conduction of said first current control means to operate said motor in a direction to reduce the delay time of said adjustable time delay circuit and responsive to conduction of said second current control means to operate said motor in the opposite direction, whereby to adjust the delay time of said adjustable time delay circuit to substantially the time interval between said reference pulses and said indicating pulses.

2. In a receiver for use with a pulse modulated transmission system radiating a series of reference pulses each followed by an indicating pulse in timed relation thereto, a pulse receiver responsive to said radiated pulses, means responsive to said indicating pulses to produce a first operating pulse, an adjustable time delay circuit having a mechanically operated control, said adjustable time delay circuit being responsive to said reference pulses to produce a second operating pulse delayed in time an amount depending upon the relative position of said mechanically operated control, a comparison circuit comprising first and second current control means each responsive to the application of a pulse thereto to render it conductive, means responsive to conduction of either of said current control means to render the other of said current control means unresponsive to the application of a pulse thereto, means for applying said first operating pulse to said first current control means and means for applying said second operating pulse to said second current control means, and mechanical means connected to said mechanically operated control of said adjustable time delay circuit to adjust the delay time thereof and responsive to conduction of said first current control means to shorten said delay time and responsive to conduction of said second current control means to lengthen said delay time, whereby the delay time of said adjustable time delay circuit to substantially correspond to the time interval between said reference pulses and said indicating pulses.

3. In a navigation system for use with a radio beacon transmitting a series of reference pulses each followed by an indicating pulse spaced therefrom by a time interval proportional to the direction of transmission, a pulse receiver adapted to receive said pulse signals from said radio beacon, means for producing first operating pulses in response to said indicating pulses, an adjustable time delay circuit having angularly shiftable control shaft, said adjustable time delay circuit being responsive to said reference pulses to produce second operating pulses spaced from said reference pulses by a time interval proportional to the angular position of said shaft, an angular position indicator attached to said shaft, a comparison circuit comprising first and second current control means, each responsive to operating pulses to render said current control means conductive, means responsive to the conduction of either of said current control means to render the other of said current control means unresponsive to operating pulses, means for impressing said first operating pulses on said first current control means, means for impressing said second operating pulses on said second control means, and reversible electric motor means connected to said shaft and responsive to conduction of said first current control means to operate said shaft in a direction to reduce the delay time of said variable time delay circuit and responsive to conduction of said second current control means to operate said shaft in the other direction, whereby said adjustable time delay circuit is regulated to substantially the same delay time as the interval between said reference pulses and said indicating pulses and said angular position indicator indicates the direction from said pulse receiver to said radio beacon.

4. In a mobile receiving station responsive to a radio transmission system radiating a series of reference pulses each followed by an indicating pulse spaced therefrom by a time interval indicative of the position of a device, a pulse receiver responsive to said radiated signal, means for producing first operating pulses in response to said indicating pulses, an adjustable time delay circuit having a control member, said adjustable time delay circuit being responsive to said reference pulses to produce second indicating pulses delayed from said reference pulses by a time interval dependent upon the position of said control member, a comparison circuit comprising first and second normally non-conducting grid controlled gas tubes having their cathodes connected together and through a resistance to ground and their respective anodes connected to a source of direct current through individualized high resistances paralleled by individualized capacitances, means for applying individualized negative biases to the control grids of said gas tubes relative to ground, means for applying said first operating pulses to the control grid of said first gas tube, means for applying said second operating pulses to the control grid of said second gas tube whereby an operating pulse applied to the grid of either tube renders said tube conducting for a time interval determined by charging time of the individualized capacitance associated therewith and increases the bias on the other of said gas tubes to render it unresponsive to operating pulses during conducting time of said tube, and a reversible electric motor mechanically connected to said control member and responsive to conduction of said first gas tube to move said control member in a direction to reduce the delay time of said adjustable time delay circuit and responsive to conduction of said second gas tube to rotate in the opposite direction, whereby the delay time of the adjustable time delay circuit is adjusted to substantially the time interval between said reference pulses and said indicating pulses.

5. In a mobile receiving station for use with a radio beacon radiating a series of reference pulses each followed by an indicating pulse spaced therefrom by a time interval depending upon the direction of transmission of said radiated pulses, a pulse receiver responsive to said radiated signals comprising means responsive to said indicating pulses for producing first operating pulses, an adjustable time delay circuit having an angularly shiftable control shaft, said adjustable time delay circuit being responsive to said reference pulses to produce second operating pulses delayed from said reference pulses by an amount depending upon the angular position of said shaft associated therewith, an angular position indicator operatively driven by said shaft, a comparison circuit first and second normally non-conducting grid controlled gas tubes having their cathodes connected together and through a resistance to ground and their respective anodes connected to a source of anode power through individualized high resistances each paralleled by a capacitance, means for applying individualized negative grid biases to the control grids of said gas tubes relative to ground, whereby an operating pulse applied to the grid of either tube renders said tube conductive during the charging time of the capacitance associated therewith and thereby increases the negative bias on the control grid of the other of said gas tubes to render it unresponsive to operating pulses applied thereto, and a reversible electric motor drivingly connected to said shaft and responsive to conduction of said first gas tube to rotate said shaft in a direction to reduce the delay time of said adjustable time delay circuit and responsive to conduction of said second gas tube to rotate said shaft in the opposite direction, whereby said angular position indicator indicates the direction from said mobile station to said radio beacon.

References Cited in the file of this patent

UNITED STATES PATENTS

| | | |
|---|---|---|
| 2,449,982 | De Rosa | Sept. 28, 1948 |
| 2,450,005 | Labin | Sept. 28, 1948 |
| 2,531,425 | Grieg | Nov. 28, 1950 |